United States Patent
Lee et al.

(10) Patent No.: US 7,957,086 B2
(45) Date of Patent: Jun. 7, 2011

(54) HARD DISK DRIVE APPARATUS, METHOD TO CONTROL FLYING HEIGHT OF MAGNETIC HEAD THEREOF, AND RECORDING MEDIA FOR COMPUTER PROGRAM THEREFOR

(75) Inventors: Chang-Hwan Lee, Seoul (KR); Hae Jung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 12/031,943

(22) Filed: Feb. 15, 2008

(65) Prior Publication Data
US 2008/0198497 A1 Aug. 21, 2008

(30) Foreign Application Priority Data
Feb. 16, 2007 (KR) .................. 10-2007-0016457

(51) Int. Cl.
*G11B 5/02* (2006.01)
(52) U.S. Cl. ........................................ 360/59
(58) Field of Classification Search .......... 360/75, 360/55, 69, 59
See application file for complete search history.

(56) References Cited

U.S. PATENT DOCUMENTS

| 5,991,113 | A | 11/1999 | Meyer et al. | |
|---|---|---|---|---|
| 6,950,266 | B1 * | 9/2005 | McCaslin et al. | 360/75 |
| 7,092,193 | B1 | 8/2006 | McKenzie et al. | |
| 7,426,090 | B2 * | 9/2008 | Yamashita et al. | 360/75 |
| 7,457,073 | B2 * | 11/2008 | Kurita et al. | 360/75 |
| 7,468,854 | B2 * | 12/2008 | Yamashita et al. | 360/75 |
| 7,583,467 | B2 * | 9/2009 | Lee | 360/75 |
| 7,620,519 | B2 * | 11/2009 | Yoon | 702/166 |
| 7,633,703 | B2 * | 12/2009 | Ota | 360/75 |
| 2002/0097517 | A1 * | 7/2002 | Bonin et al. | 360/75 |
| 2004/0114268 | A1 | 6/2004 | Satoh et al. | |
| 2005/0094316 | A1 | 5/2005 | Shiramatsu et al. | |
| 2006/0066978 | A1 | 3/2006 | Takagi et al. | |
| 2006/0119974 | A1 | 6/2006 | Yamazaki et al. | |
| 2006/0126224 | A1 | 6/2006 | Sakamoto et al. | |
| 2007/0030593 | A1 | 2/2007 | Hiroyuki et al. | |
| 2007/0230015 | A1 * | 10/2007 | Yamashita et al. | 360/75 |
| 2008/0043372 | A1 * | 2/2008 | Shimozato | 360/235.1 |
| 2008/0151428 | A1 * | 6/2008 | Kushima et al. | 360/235.4 |

FOREIGN PATENT DOCUMENTS

JP 2004-79126 3/2004

OTHER PUBLICATIONS

European Office Action issued Feb. 20, 2009 in EP Application No. 08151267.5.

* cited by examiner

*Primary Examiner* — Fred Tzeng
(74) *Attorney, Agent, or Firm* — Stanzione & Kim, LLP

(57) ABSTRACT

A method of controlling a flying height of a magnetic head of a hard disk drive apparatus includes producing a reference FOD (flying on demand) voltage profile defining a relationship between the flying height of the magnetic head and an FOD voltage at a measured temperature, wherein an end of the magnetic head thermally expands and protrudes when the FOD voltage is applied to a heater included in the magnetic head and setting the reference FOD voltage profile that is corrected using a reference maximum flying height of the magnetic head that is preset at room temperature, as an applied FOD voltage profile to control the flying height of the magnetic head.

21 Claims, 8 Drawing Sheets

HARD DISK DRIVE APPARATUS, METHOD TO CONTROL FLYING HEIGHT OF MAGNETIC HEAD THEREOF, AND RECORDING MEDIA FOR COMPUTER PROGRAM THEREFOR

CROSS-REFERENCE TO RELATED APPLICATIONS

This application claims priority under 35 U.S.C. §119(a) from of Korean Patent Application No. 10-2007-0016457, filed on 16 Feb. 2007, in the Korean Intellectual Property Office, the disclosure of which is incorporated herein in its entirety by reference.

BACKGROUND OF THE INVENTION

1. Field of the Invention

The present general inventive concept relates to a hard disk drive apparatus, a method to control flying height (FH) of a magnetic head of the hard disk drive apparatus, and recording media for a computer program to perform the method, and more particularly, to a hard disk drive apparatus that can actively control the FH of a magnetic head, a method to control the FH of a magnetic head of the hard disk drive apparatus, and recording media for a computer program to perform the method.

2. Description of the Related Art

Hard disk drive apparatus (HDDs) formed of electronic parts and mechanical parts are memory devices to record and reproduce data by converting digital electric pulses to a magnetic field that is more permanent. The HDDs are widely used as auxiliary memory devices of computer systems because of fast access time to a large amount of data.

With the recent increase in TPI (tracks per inch; a density in a radial direction of a disk) and BPI (bits per inch; a density in a rotational direction of a disk), the HDD has achieved a high capacity and its application field has expanded. Accordingly, there has been a request for development of compact HDDs that can be used for portable electronic products such as notebooks, personal digital assistants (PDAs), and mobile phones. HDDs having a diameter of 2.5 inches are already developed and applied to notebook computers. Compact HDDs having a diameter of 0.85 inches, which are as small as a coin, have been recently developed and are expected to be used for mobile phones or MP3 players in the future.

As the capacity of the HDD increases, the size of a read/write sensor of a magnetic head decreases and a flying height (FH) of the magnetic head that is lifted over a recording surface of a disk gradually decreases. That is, when a high TPI and a high BPI are realized to manufacture a high capacity HDD, the width of a track decreases. When the track width decreases, a strength of a magnetic field becomes weak accordingly. Thus, writing data to the recording surface of the disk or reproducing data from the recording surface of the disk is not smoothly performed.

For this reason, methods of effectively reducing an interval between the disk and the magnetic head, that is, reducing the FH of the magnetic head with respect to the disk, have been and are actively being developed as a condition precedent to improve the read/write performance of the magnetic head with respect to the disk. One of the methods is to reduce dispersion of the FH of the magnetic head and another method is to effectively control the FH to obtain the minimum FH of the magnetic head.

FIG. 1 illustrates changes in a FH of a magnetic head according to temperature changes in an HDD according to a conventional technology. FIG. 2 is a graph illustrating in non-dimension the FH of a magnetic head according to the measured temperature in the HDD of FIG. 1. Recently, the FH of a magnetic head 141 is measured using a flying on demand (FOD) apparatus in a burn-in process. An FOD voltage is selected to maintain the magnetic head 141 at a desired FH in a user environment.

In detail, when an FOD voltage that gradually increases is applied to the magnetic head 141 through a touchdown test in the burn-in process, the magnetic head 141 lifted and maintained at a predetermined height is lowered toward a disk 111 and then contacts the disk 111. A reference FOD voltage profile indicating a relationship between the FOD voltage and the FH of the magnetic head 141 through the touchdown test is provided.

An FOD voltage needed for a target clearance, that is, a target FH, in an actual user environment is produced from the reference FOD voltage profile. Related data is stored in a maintenance cylinder of the disk 111. Thus, the FOD voltage produced in the burn-in process is applied to a heater (not illustrated) included in the magnetic head 141 in the user environment so that the target FH of the magnetic head 141 is maintained.

However, in the conventional method for controlling the FH of the magnetic head 141 of the hard disk drive apparatus, it is a problem that a measured value is used in the burn-in process, in particular, in an actual user environment without considering the change in the FH according to the temperature. Accordingly, the FH of the magnetic head 141 in the burn-in process may be a value in a normal condition, that is, at room temperature. When during the burn-in process conditions where the temperature when the FH of the magnetic head 141 is measured is the room temperature and the magnetic head 141 flies at the original FH are satisfied, the FOD voltage to set the target FH in the user environment is selected based on the FH of the magnetic head 141. However, although external environment conditions are controlled in the burn-in process, in practice the temperatures of all hard disk drives cannot be equally maintained due to various limits.

In general, as illustrated in FIGS. 1 and 2, in an environment in which the temperature is higher than at room temperature, the FH of the magnetic head 141 is lower than that in the room temperature. In an environment in which temperature is lower than the room temperature, the FH of the magnetic head 141 is higher than that at room temperature. That is, even in the burn-in process, the measurement operation can be carried out at a temperature condition different from room temperature. When the measurement is made in such a condition, the FH of the magnetic head 141 can be mis-measured. Accordingly, an incorrect FOD voltage is selected in the user environment. When the mis-measured FOD voltage due to the incorrect temperature is applied to the magnetic head 141 to control the FH of the magnetic head 141, various problems can be generated.

Referring to (B) and (C) of FIG. 1, when the burn-in process is performed in the higher temperature environment, FH2 of the magnetic head 141 is measured to be lower than FH1 of the magnetic head 141 at the room temperature and a lower FOD voltage is selected for the target FH in a user environment. Then, when the temperature in an actual user environment is lower than the high temperature environment, the FH of the magnetic head 141 is maintained at a position higher than the target FH. As a result, a reliability problem such as weak write can be generated.

Also, referring to (A) and (B) of FIG. 1, when the burn-in process is preformed in the lower temperature environment, FH3 of the magnetic head 141 is measured to be higher than the FH1 of the magnetic head 141 at the room temperature and a higher FOD voltage is selected for the target FH in a user environment. Then, when the temperature in an actual user environment is higher than the high temperature environment, the FH of the magnetic head 141 is maintained at a position lower than the target FH. As a result, a head disk interference (HDI) where the magnetic head 141 and the disk 111 collide with each other can be generated.

That is, when the burn-in process is performed not at the room temperature but at a temperature higher or lower than the room temperature, the FH of the magnetic head 141 can be incorrectly measured. Accordingly, in the actual user environment, since the incorrectly measured FOD voltage is applied due to the effect of the temperature, the weak write or HDI can be generated.

SUMMARY OF THE INVENTION

The present general inventive concept provides a hard disk drive apparatus that can improve reliability in a FOD control by preventing weak write or HDI generated when an FOD voltage needed to maintain a target FH of a magnetic head is incorrectly selected due to the effect of a burn-in process to measure a FH of the magnetic head using an FOD apparatus, in particular, by an effect of temperature, a method to control the FH of a magnetic head of the hard disk drive apparatus, and recording media containing a computer program to perform the method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling a flying height of a magnetic head of a hard disk drive apparatus that includes producing a reference FOD (flying on demand) voltage profile defining a relationship between the flying height of the magnetic head and an FOD voltage at a measured temperature, wherein an end portion of the magnetic head thermally expands and protrudes when the FOD voltage is applied to a heater included in the magnetic head, and setting the reference FOD voltage profile that is corrected using a reference maximum flying height of the magnetic head that is preset at room temperature, as an applied FOD voltage profile to control the flying height of the magnetic head.

The reference maximum flying height of the magnetic head may be the maximum flying height of the magnetic head corresponding to a value set at the room temperature.

In the setting of the reference FOD voltage profile that is corrected using a reference maximum flying height of the magnetic head that is preset at room temperature, as an applied FOD voltage profile to control the flying height of the magnetic head, the reference FOD voltage profile may be corrected based on a difference between the reference maximum flying height corresponding to a value set at the room temperature and the maximum flying height of the magnetic head in the reference FOD voltage profile, and the corrected FOD voltage profile may be set as the applied FOD voltage profile.

The setting of the reference FOD voltage profile that is corrected using a reference maximum flying height of the magnetic head that is preset at the room temperature, as an applied FOD voltage profile to control the flying height of the magnetic head, may include obtaining a delta maximum flying height that is the difference between the reference maximum flying height and the maximum flying height of the magnetic head in the reference FOD voltage profile, and correcting the FOD voltage profile by correcting a measured flying height of the magnetic head by subtracting a value produced from a predetermined equation from the delta maximum flying height of the magnetic head and a ratio of an FOD voltage of a predetermined amount to a touchdown FOD voltage when the magnetic head touches down in the reference FOD voltage profile from the measured flying height of the magnetic head in the reference FOD voltage profile when the FOD voltage of a predetermined amount is applied, and setting the corrected FOD voltage profile as the applied FOD voltage profile to control the flying height of the magnetic head.

The value that may be produced as the ratio of the FOD voltage of a predetermined amount to the touchdown voltage and the delta maximum flying height by the predetermined equation may be a value obtained by multiplying the ratio of the FOD voltage of a predetermined amount to the touchdown FOD voltage by the delta maximum flying height.

The maximum flying height of the magnetic head in the reference FOD voltage profile may be the maximum flying height of the magnetic head measured at the measured temperature.

The maximum flying height of the magnetic head in the reference FOD voltage profile may be produced based on a rate of a change in the maximum flying height of the magnetic head for each temperature obtained by a predetermined experiment formula.

The foregoing and/or other aspects and utilities of the present general inventive concept may also be achieved by providing a computer-readable recording medium having embodied thereon a computer program to execute a method, the method including producing a reference FOD (flying on demand) voltage profile defining a relationship between a flying height of a magnetic head and an FOD voltage at a measured temperature, wherein an end portion of the magnetic head thermally expands and protrudes when the FOD voltage is applied to a heater included in the magnetic head, and setting the reference FOD voltage profile that is corrected using a reference maximum flying height of the magnetic head that is preset at room temperature, as an applied FOD voltage profile to control the flying height of the magnetic head.

The foregoing and/or other aspects and utilities of the present general inventive concept may also be achieved by providing a hard disk drive apparatus including a magnetic head to record data on a disk or to reproduce data from the disk, and a controller to produce a reference FOD (flying on demand) voltage profile defining a relationship between the flying height of the magnetic head and an FOD voltage at a measured temperature, wherein an end of the magnetic head thermally expands and protrudes when the FOD voltage is applied to a heater included in the magnetic head, to correct the reference FOD voltage profile using a reference maximum flying height of the magnetic head that is preset at room temperature, and to control the flying height of the magnetic head based on an applied FOD voltage profile that is the corrected reference FOD voltage profile.

The reference maximum flying height of the magnetic head may be the maximum flying height of the magnetic head corresponding to a value set at the room temperature.

The controller may correct the reference FOD voltage profile based on a difference between the reference maximum flying height corresponding to a value set at the room temperature and the maximum flying height of the magnetic head in the reference FOD voltage profile to correct the FOD voltage profile using the reference maximum flying height of the magnetic head.

To correct the FOD voltage profile based on the difference between the reference maximum flying height and the maximum flying height of the magnetic head in the reference FOD voltage profile, the controller may obtain a delta maximum flying height that is the difference between the reference maximum flying height and the maximum flying height of the magnetic head in the reference FOD voltage profile and correct the FOD voltage profile by subtracting a value produced from a predetermined equation from the delta maximum flying height of the magnetic head and a ratio of an FOD voltage of a predetermined amount to a touchdown FOD voltage when the magnetic head touches down in the reference FOD voltage profile from the measured flying height of the magnetic head in the reference FOD voltage profile when the FOD voltage of a predetermined amount is applied.

The value that may be produced as the ratio of the FOD voltage of a predetermined amount to the touchdown voltage and the delta maximum flying height by the predetermined equation may be a value obtained by multiplying the ratio of the FOD voltage of a predetermined amount to the touchdown FOD voltage by the delta maximum flying height.

The maximum flying height of the magnetic head in the reference FOD voltage profile may be the maximum flying height of the magnetic head measured at the measured temperature.

The maximum flying height of the magnetic head in the reference FOD voltage profile may be produced based on a rate of a change in the maximum flying height of the magnetic head for each temperature obtained by a predetermined experiment formula.

The foregoing and/or other aspects and utilities of the general inventive concept may also be achieved by providing a hard disk drive apparatus usable in a user environment, including a magnetic head to record data to or reproduce data from a disk and a controller to control a flying height of the magnetic head with respect to the disk based on a calculated reference maximum flying height set at room temperature.

The foregoing and/or other aspects and utilities of the general inventive concept may also be achieved by providing a hard disk drive apparatus usable in a user environment, including a magnetic head to record data to or reproduce data from a disk and a controller to produce a reference FOD (flying on demand) voltage profile, to correct the reference FOD voltage profile using a reference maximum flying height of the magnetic head set at room temperature and to control a flying height of the magnetic head based on the corrected reference FOD voltage profile.

The foregoing and/or other aspects and utilities of the general inventive concept may also be achieved by providing a method of controlling a flying height of a magnetic head of a hard disk drive apparatus, the method including recording data to or reproducing data from a disk in a user environment and controlling a flying height of the magnetic head with respect to the disk based on a reference maximum flying height set at room temperature.

The foregoing and/or other aspects and utilities of the general inventive concept may also be achieved by providing a method of controlling flying height of a magnetic head of a hard disk drive apparatus, the method including recording data to or reproducing data from a disk in a user environment, producing a reference FOD (flying on demand) voltage profile, correcting the reference FOD voltage profile using a reference maximum flying height of the magnetic head set at room temperature and controlling a flying height of the magnetic head based on the corrected reference FOD voltage profile.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
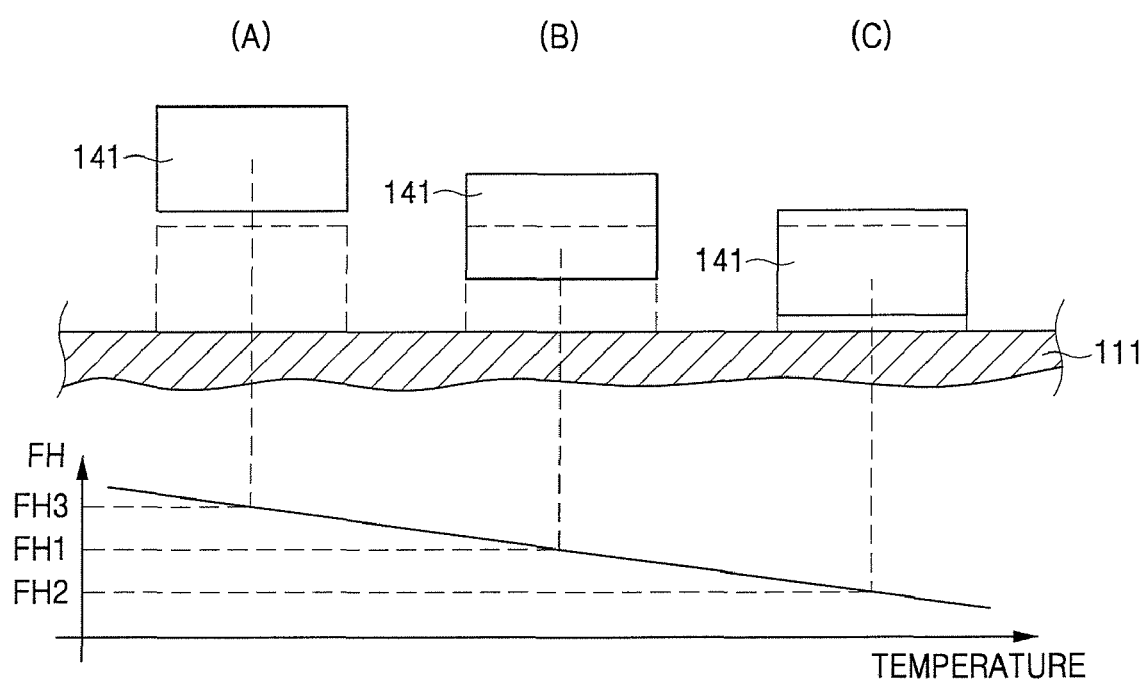
FIG. 1 illustrates changes a flying height (FH) of a magnetic head according to temperature changes in an HDD according to a conventional technology.
Figure 2:
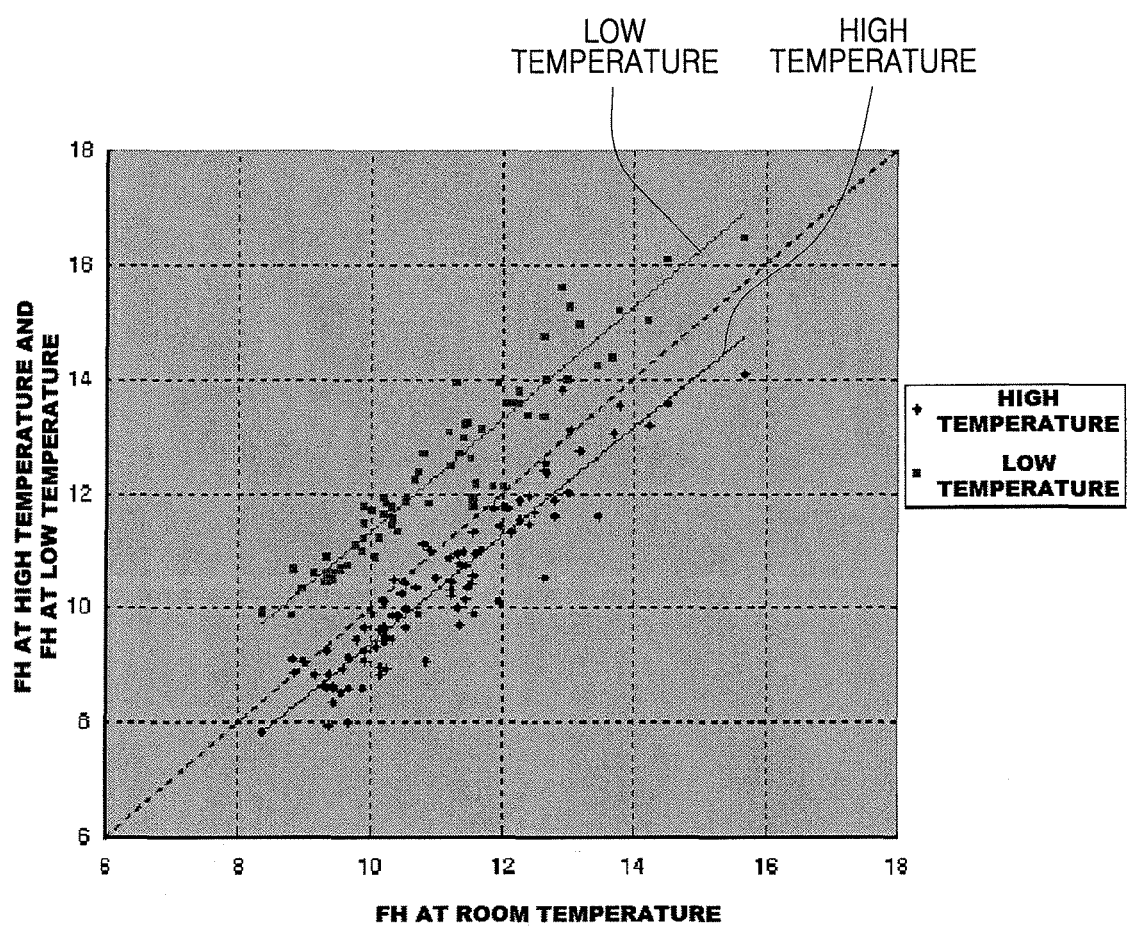
FIG. 2 is a graph illustrating in non-dimension the FH of a magnetic head according to the measured temperature in the HDD of FIG. 1.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
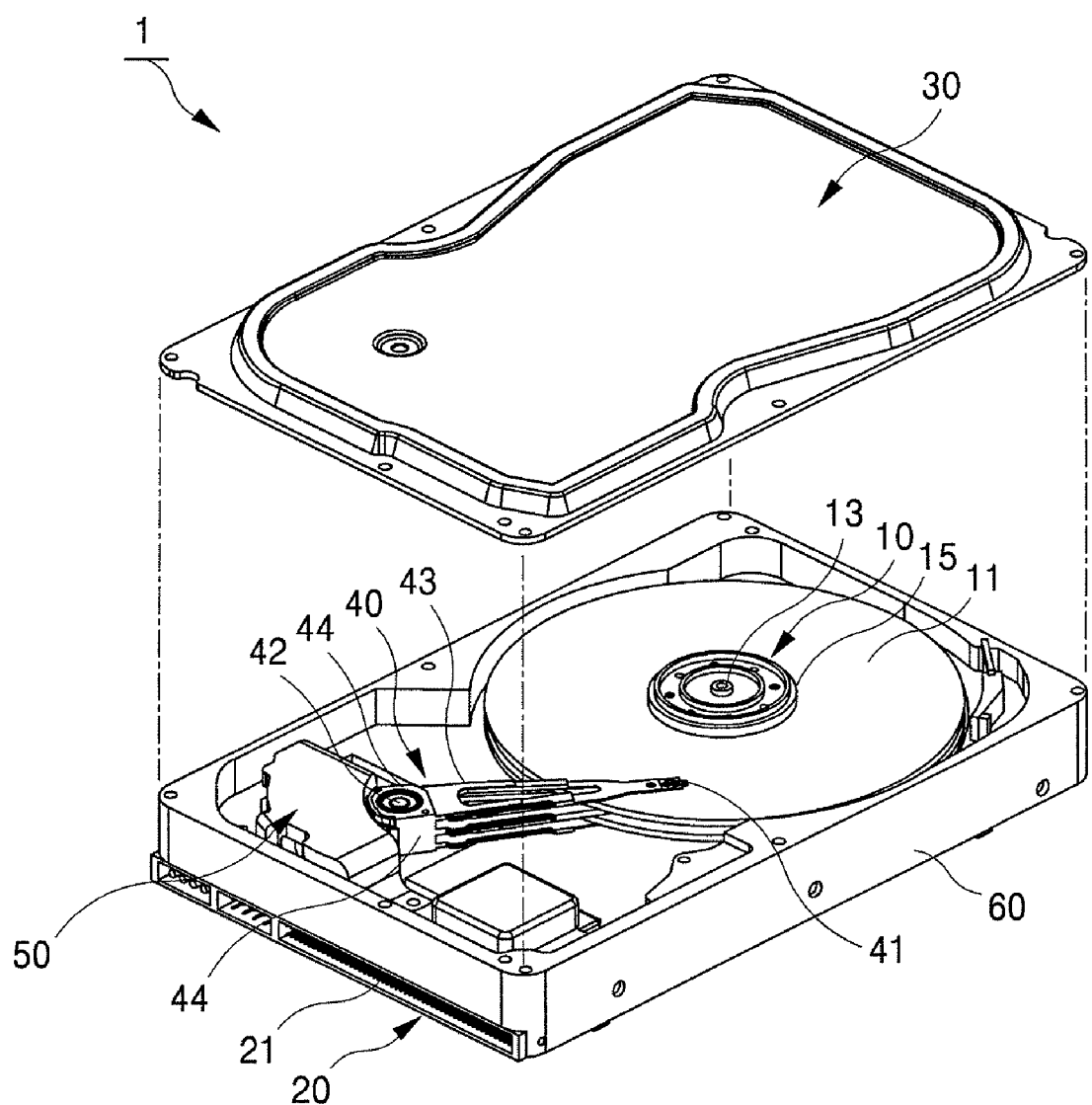
FIG. 3 is a partially exploded perspective view illustrating a hard disk drive apparatus according to an embodiment of the present general inventive concept.

FIG. 3 is a partially exploded perspective view illustrating a hard disk drive apparatus according to an embodiment of the present general inventive concept. Referring to FIG. 3, a hard disk drive apparatus 1 according to an embodiment of the present general inventive concept includes a disk pack 10 having at least one disk 11 to record and reproduce data, a printed circuit board assembly (PCBA) 20, a cover 30, a head stack assembly (HSA) 40 having a magnetic head (read/write head) 41 disposed at a tip end portion thereof to read out data from the disk 11, a voice coil motor (VCM) 50 to pivot the HSA 40, and a base 60 to support these elements.

The disk pack 10 includes a disk 11, a shaft 13 to form a rotation center of the disk 11, a spindle motor hub (not illustrated) provided outside the shaft 13 in a radial direction to support the disk 11, a clamp 15 coupled to an upper portion of the spindle motor hub, and a clamp screw (not illustrated) pressing the clamp 15 to fix the disk 11 to the spindle motor hub.

The PCBA 20 includes a printed circuit board (PCB, not illustrated) having a plate shape and a PCB connector 21 provided at a side of the PCB. A plurality of chips (not illustrated) and circuits are provided on the PCB to control the disk 11 and the magnetic head 41. The PCB connector 21 is to transmit to and receive from an external unit. The cover 30 forms an accommodation space to accommodate the disk pack 10 and the HSA 40 by covering a top surface of the base 60, thus protecting various components in the accommodation space.

The HSA 40 is a carriage to write data to the disk 11 or reproduce data from the disk 11. The HSA 40 includes the magnetic head 41 to read or to write data with respect to the disk 11, an actuator arm 43 to pivot across the disk 11 around a pivot shaft 42 as a pivot center so that the magnetic head 41 can access data on the disk 11, a suspension (not illustrated) coupled to the end portion of the actuator arm 43, a pivot shaft holder 44 to rotatably support the pivot shaft 42 and having the actuator arm 43 coupled thereto, and a bobbin (not illustrated) provided at an opposite side of the actuator arm 43 with respect to the pivot shaft holder 44 and located between magnets (not illustrated) of the VCM 50.

The magnetic head 41 reads or writes information with respect to the disk 11, that is, rotating by detecting a magnetic field formed on the surface of the disk 11 or magnetizing the surface of the disk 11. The magnetic head 41 includes a read head to detect a magnetic field of the disk 11 and a write head to magnetize the disk 11.

The magnetic head 41 performs write and read operations with respect to the disk 11 by being lifted from the disk 11 due to an air flow generated during the rotation of the disk 11. The magnetic head 41 maintains a predetermined flying height (FH), that is, a target clearance. Thus, as described above, the hard disk drive apparatus 1 further comprises a controller 70 (FIG. 4) to adjust the FH of the magnetic head 41 with respect to the disk 11 by applying a flying on demand (FOD) power to the magnetic head 41 that flies over the disk 11 to perform the write and read operations.

Figure 4:
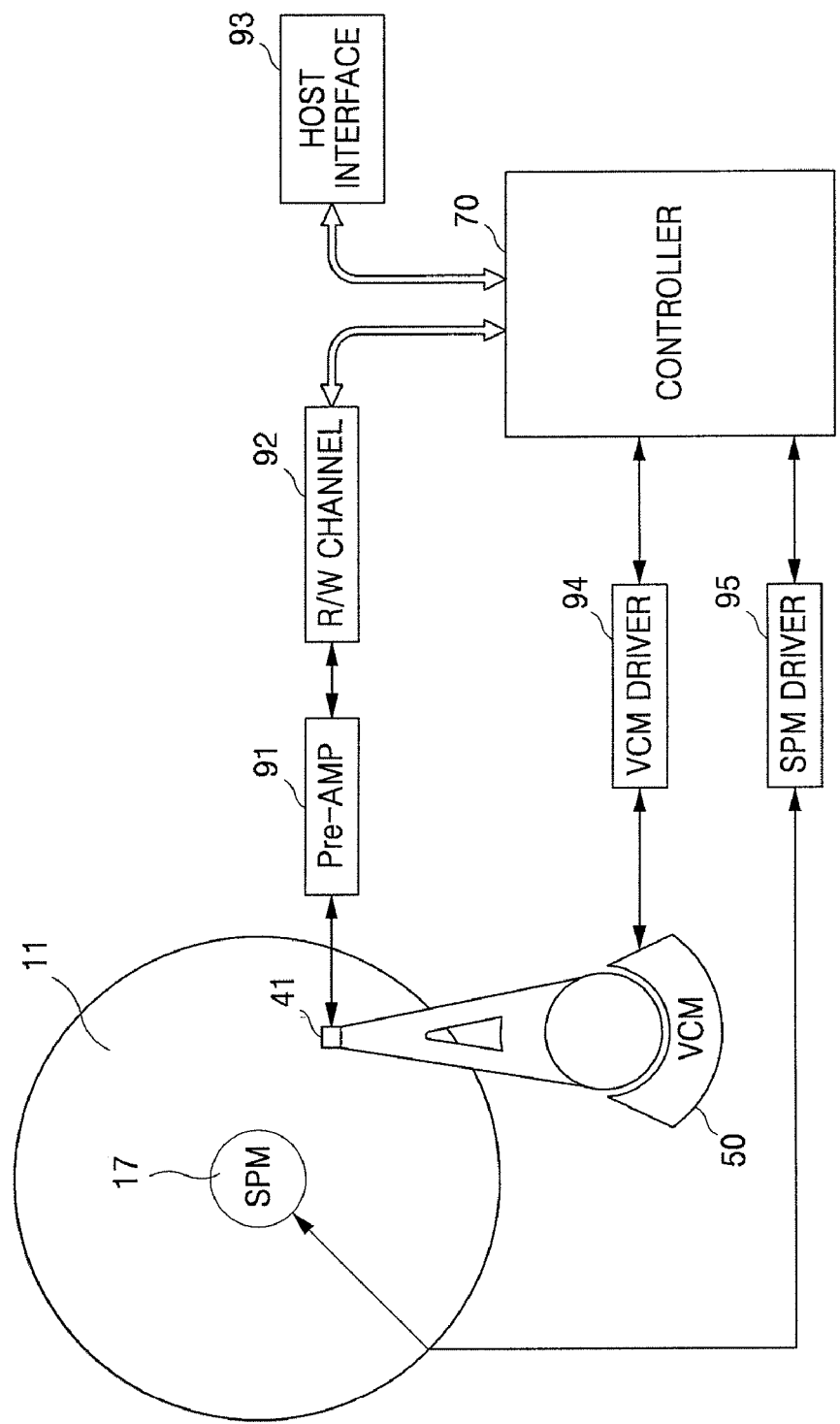
FIG. 4 is a block diagram illustrating a drive circuit of a hard disk drive apparatus to which a method to correct the FH of a magnetic head of the hard disk drive apparatus of FIG. 3 is applied.

FIG. 4 is a block diagram illustrates a drive circuit of a hard disk drive apparatus to which a method to correct the FH of a magnetic drive head of the hard disk drive apparatus of FIG. 3 is applied. Referring to FIG. 4, the controller 70 controls a pre-amplifier (Pre-AMP) 91, a read/write channel (R/W channel) 92, a host interface 93, a VCM driver 94, and a spindle motor (SPM) driver 95.

The pre-amplifier 91 amplifies a data signal reproduced by the magnetic head 41 from the disk 11 or a write current converted by the read/write channel 93 to write the amplified signal or current to the disk 11 through the magnetic head 41. The read/write channel 92 converts the signal amplified by the pre-amplifier 91 to a digital signal and transmits the converted signal to a host device (not illustrated) through the host interface 93, or receives data input by a user through the host interface 93, converts the received data to a binary data stream that is easy to write, and inputs the converted stream to the pre-amplifier 91.

The host interface 93 transmits the converted digital data to the host device, or receives the data input by the user from the host device and inputs the received data to the read/write channel 92 via the controller 70. The host device is used to collectively indicate components such as a CPU or I/O controller of a computer that generally controls and operates the overall computer including the hard disk drive apparatus 1.

The VCM driver 94 receives a control signal of the controller 70 and controls an amount of current applied to the VCM 50. The SPM driver 95 receives a control signal of the controller 70 and controls the amount of current applied to a spindle motor 17.

The controller 70 receives data input by the user through the host device through the host interface 93 and outputs the received data to the read/write channel 92 in a data write mode, and receives a read signal converted to a digital signal by the read/write channel 92 and outputs the received signal to the host interface 93 in a data read mode. Also, the controller 70 controls the output of the VCM driver 94 and the SPM driver 95.

The controller 70 can be a microprocessor or microcontroller and can be embodied in a form of software or firmware that performs a method to control a FH of the magnetic head 41 of the hard disk drive apparatus 1 that will be described later.

Also, the controller 70 at a measured temperature, that is, an actually measured temperature, produces a reference FOD voltage profile 71 that defines the relationship between the FH of the magnetic head 41 and the FOD voltage that makes an end of the magnetic head 41 thermally expand and protrude when the FOD voltage is applied to a heater (not illustrated) included in the magnetic head 41. The controller 70 then corrects the reference FOD voltage profile 71 using a reference maximum flying height FH_TD (FIG. 5) of the magnetic head 41 that is preset at room temperature, and controls the FH of the magnetic head 41 based on an applied FOD voltage profile 72 that is a corrected reference FOD voltage profile. Thus, even when the measured temperature in an actual burn-in process is different from the preset room temperature, that is, the temperature during the burn-in process changes, the effect of the temperature can be compensated. Thus, by using the FOD voltage produced in the user environment based on the corrected applied FOD voltage profile 72, the target FH of the magnetic head 41 can be more accurately maintained in the user environment.

A method to control the FH of a magnetic head of a hard disk drive apparatus according to an embodiment of the present general inventive concept is described in detail with reference to FIGS. 5 through 7. The manufacturing process of the hard disk drive apparatus 1 can be largely divided into, for example, a total of six processes including a mechanical assembly process, a servo write process, a function test process, a burn-in process, a final test process, a pre-shipment test process, and a package and shipment process.

First, the reference FOD voltage profile 71, that is, a profile of the FH of the magnetic head 41 with respect to the FOD voltage, is provided by performing a touchdown test in the burn-in process of the manufacturing process of the hard disk drive apparatus 1. However, as described above, it is difficult to maintain the temperature of the overall hard disk drive apparatus 1 constant even in the burn-in process. Thus, when an FOD voltage produced based on the reference FOD voltage profile 71 obtained at a temperature different from the room temperature in the burn-in process is applied to an actual user environment, a gap between the magnetic head and the disk 11 may not be maintained within a target value.

Figure 5:
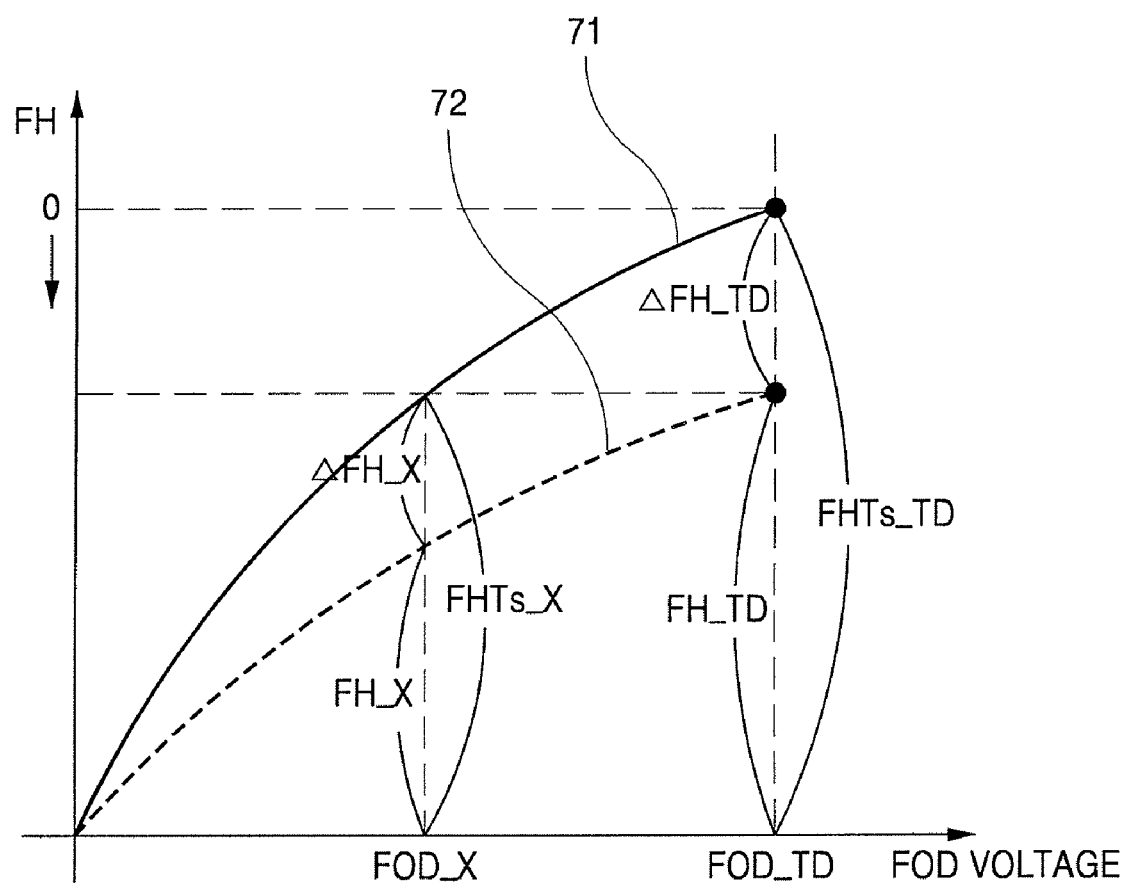
FIG. 5 is a graph illustrating a method to produce an applied flying on demand FOD voltage profile using a reference FOD voltage profile when measured temperature of an actual burn-in process is lower than a room temperature in the hard disk drive apparatus of FIG. 3.

Thus, in the present embodiment, an effect of the temperature during the burn-in process is offset by correcting the reference FOD voltage profile 71 defining the correlation between the FOD voltage applied to the magnetic head 41 and the FH of the magnetic head 41 at the measured temperature, that is, an actually measured temperature, based on the reference maximum flying height FH_TD of the magnetic head 41 that is designed (FIG. 5). Since the reference maximum flying height FH_TD of the magnetic head 41 that is designed is a value set at the room temperature, the effect between the room temperature and the measured temperature can be corrected.

The reference FOD voltage profile 71 is a profile indicating that the FH of the magnetic head 41 changes according to the FOD voltage at the measured temperature, that is, an actually measured temperature, and the reference FOD voltage profile 71 is measured in an actual burn-in process. As illustrated in FIGS. 5 and 6, the reference FOD voltage profile 71 can be represented as a curved shape. As the FOD voltage applied to the magnetic head 41 increases, the FH of the magnetic head 41 gradually decreases so that the magnetic head 41 is lowered to a position at which the magnetic head 41 touches the disk 11. The FOD voltage applied to the magnetic head 41 when the magnetic head 41 touches down the disk 11 is referred to as a touchdown FOD voltage. When the touchdown FOD voltage is applied, the FH of the magnetic head 41 is zero.

In the present embodiment, the reference FOD voltage profile 71 is corrected by being compared with the reference maximum flying height FH_TD set during the design of the magnetic head 41. That is, the reference FOD voltage profile 71 is corrected using a difference between the reference maximum flying height FH_TD and the maximum flying height FHTs_TD of the magnetic head 41 produced from a height from the original flying height to the height when the magnetic head 41 touches the disk 11. The corrected reference FOD voltage profile 71 is set as the applied FOD voltage profile 72. The reference maximum flying height FH_TD is defined at the room temperature that is a general standard and signifies the maximum flying height of the magnetic head 41 that is designed.

When the maximum flying height FHTs_TD of the magnetic head 41 is substantially the same or almost similar to the reference maximum flying height FH_TD in the reference FOD voltage profile 71, (an effect of temperature being negligible), the magnetic head 41 can maintain an appropriate flying height from the disk 11 in the user environment with the FOD voltage produced as above. Thus, data can be accurately recorded on the disk 11 or reproduced from the disk 11. However, when the FH of the magnetic head 41 of the reference FOD voltage profile 71 is greater or less than the reference maximum flying height FH_TD, the problem such as weak write or HDI is generated.

These problems are generated when the effect of temperature is great according to the measured temperature when the reference FOD voltage profile 71 is produced. To compensate for the effect, there is a method to produce an applied FOD voltage profile 72 using the reference FOD voltage profile 71 when the measured temperature in the actual burn-in process is lower than the room temperature and a method to produce the applied FOD voltage profile 72 using the reference FOD voltage profile 71 when the measured temperature in the actual burn-in process is higher than the room temperature. The methods are described below with reference to FIGS. 5 through 7.

As illustrated in FIG. 5, when the measured temperature is lower than the room temperature, the maximum flying height FHTs_TD of the reference FOD voltage profile 71 is generally greater than the reference maximum flying height FH_TD. That is, for a low temperature, the magnetic head 41 is lifted to a position that is further separated from the disk 11. Thus, more of the FOD voltage is needed to move the magnetic head 41 to the target flying height that is substantially the same at the room temperature.

However, as described above, when the reference FOD voltage profile 71 that is produced when the measured temperature is lower than the room temperature is used, the magnetic head 41 in the user environment is located at a lower position and performs the read/write operations. Accordingly, the HDI problem may be generated so that reliability in the reading by the magnetic head 41 with respect to the disk 11 can be deteriorated.

To improve the problem, in the present embodiment, the applied FOD voltage profile 72 is provided by offsetting the effect of the temperature with respect to the reference FOD voltage profile 71 of the magnetic head 41 measured at the measured temperature. The applied FOD voltage profile 72 is produced by correcting the reference FOD voltage profile 71 using the reference maximum flying height FH_TD of the magnetic head 41 that is designed.

As illustrated in FIG. 5, in obtaining a corrected flying height FH_X when the FOD voltage FOD_X having a size of "X" is applied to the magnetic head 41, first, a delta maximum flying height $\Delta$FH_TD is obtained by subtracting the reference maximum flying height FH_TD of the magnetic head 41 that is preset at the room temperature from the maximum flying height FHTs_TD of the reference FOD voltage profile 71. This can be presented as an equation $$\text{``}(\Delta\text{FH\_TD})=(\text{FHTs\_TD})-(\text{FH\_TD}) \qquad [1].\text{''}$$

Next, by subtracting a corrected value $\Delta$FH_X using the delta maximum flying height $\Delta$FH_TD from the flying height FHTs_X of the magnetic head 41 when the FOD voltage FOD_X having a size of "X" is applied in the reference FOD voltage profile 71, an applied flying height FH_X of the magnetic head 41 when the FOD voltage FOD_X having a size of "X" is applied can be obtained. The corrected value $\Delta$FH_X can be obtained by dividing the FOD voltage FOD_X having a size of "X" at the measured temperature by the FOD voltage FOD_TD when the magnetic head 41 touches the disk 11 and then multiplying the dividend by the delta maximum flying height $\Delta$FH_TD. Thus, when the FOD voltage FOD_X having a size of "X" is applied, an equation "(FH_X)= (FHTs_X)−($\Delta$FH_TD)(FOD_X)/(FOD_TD) . . . [2]" is established.

In the method, while the effect of the temperature with respect to the reference FOD voltage profile 71 is offset, the applied FOD voltage profile 72 that is a base of the control of the FH of the magnetic head 41 in the user environment can be produced. Even when the measured temperature in the actual burn-in process is lower than the room temperature, the reference FOD voltage profile 71 can be corrected to the applied FOD voltage profile 72 based on the preset reference maximum flying height FH_TD. By doing so, even when the magnetic head 41 undergoes the burn-in process at the measured temperature that is lower than the room temperature, the applied FOD voltage profile 72 based on the room temperature can be used in the actual user environment so that the FH of the magnetic head 41 with respect to the disk 11 can be appropriately controlled.

Figure 6:
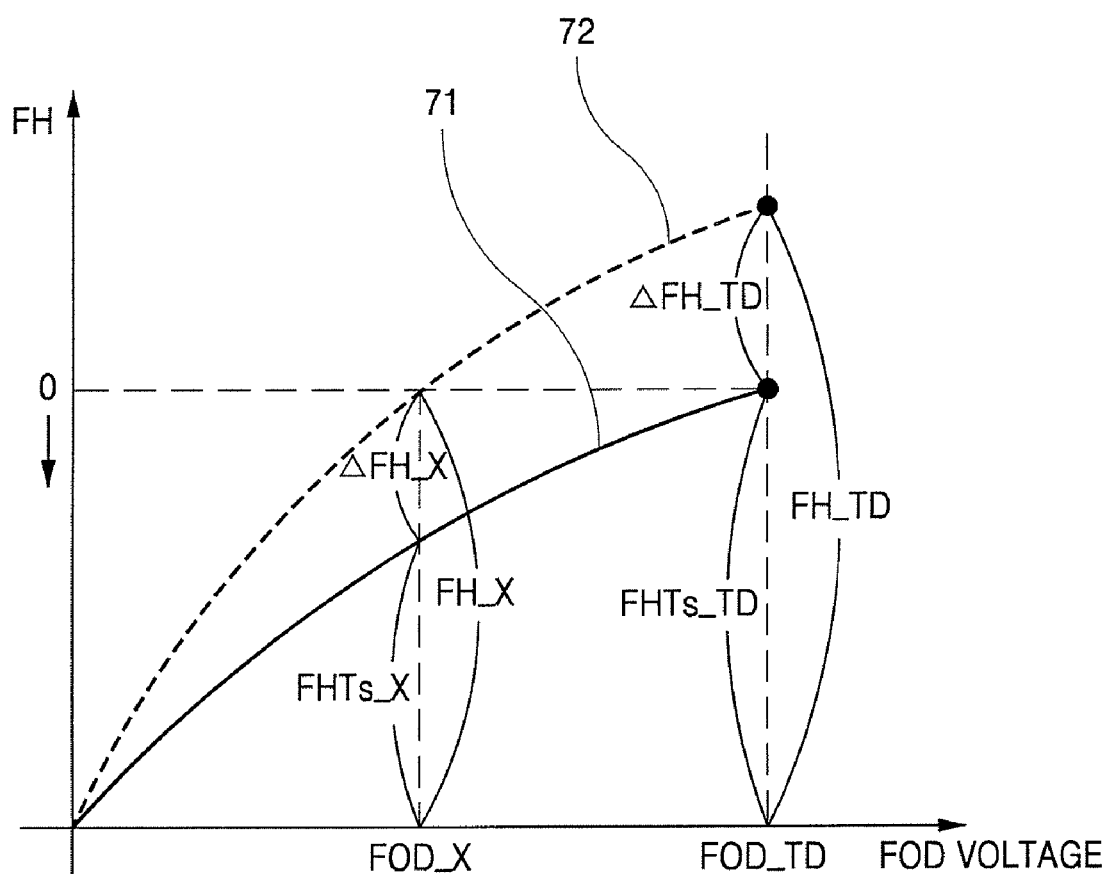
FIG. 6 is a graph illustrating a method to produce an applied flying on demand FOD voltage profile using a reference FOD voltage profile when measured temperature of an actual burn-in process is higher than a room temperature in the hard disk drive apparatus of FIG. 3.
Figure 7:
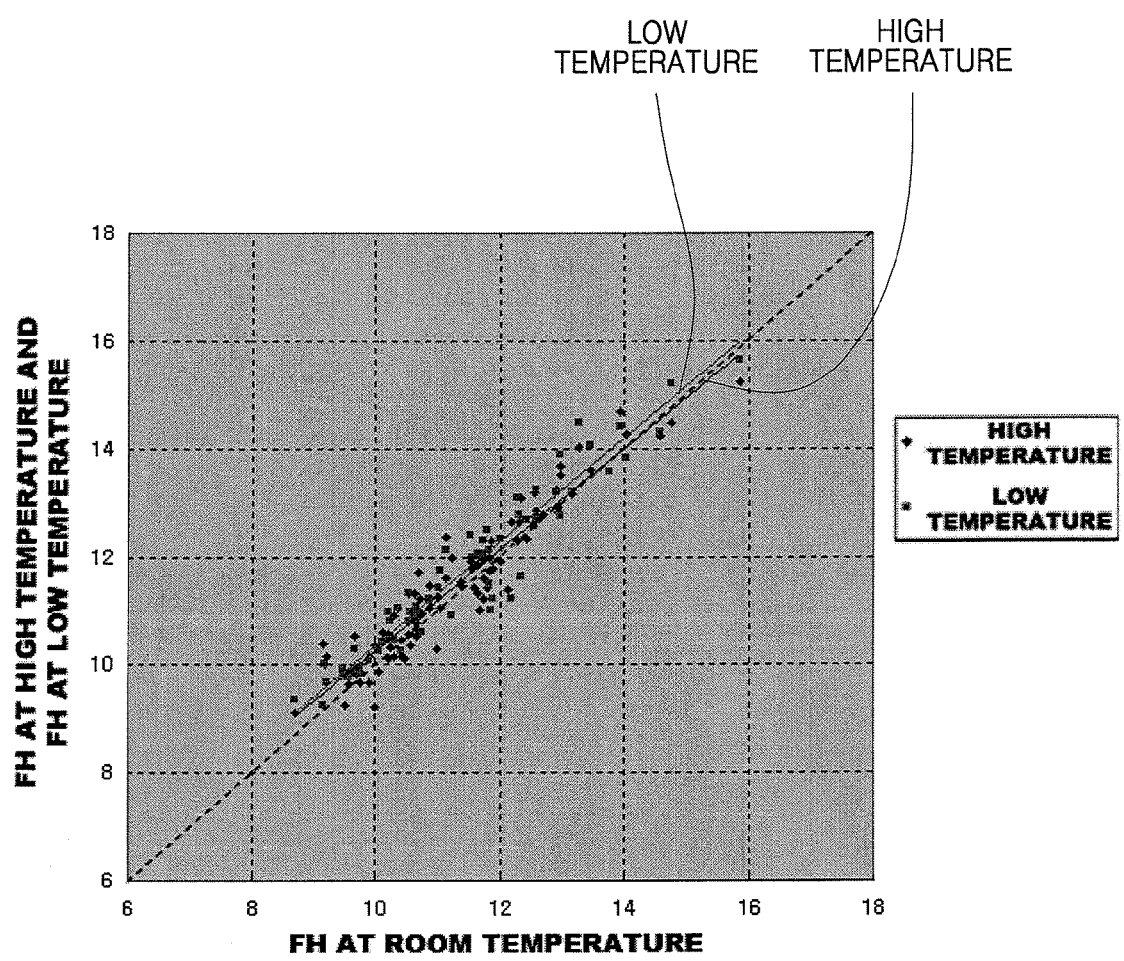
FIG. 7 is a graph illustrating in a non-dimension an applied FOD voltage profile corrected based on a reference maximum FH after a reference FOD voltage profile according to measured temperature in the hard disk drive apparatus of FIG. 3 is produced.

When the measured temperature in the actual burn-in process is higher than the room temperature, as illustrated in FIG. 6, the maximum flying height FHTs_TD of the magnetic head 41 in the reference FOD voltage profile 71 is generally smaller than the reference maximum flying height FH_TD of the magnetic head 41 at the room temperature. That is, when the measured temperature of the actual burn-in process is higher than the room temperature, the magnetic head 41 maintains its flying height lower than the target flying height. Accordingly, a smaller FOD voltage is needed to move the magnetic head 41 to the target flying height that is substantially the same as that at the room temperature.

However, when the reference FOD voltage profile 71 that is produced when the measured temperature is higher than the room temperature is used, the magnetic head 41 in the user environment is located at a higher position and performs the read/write operations. Accordingly, the weak write problem may be generated so that reliability in the reading by the magnetic head 41 with respect to the disk 11 can be deteriorated.

To improve the problem, the applied FOD voltage profile 72 in which the effect of the temperature is offset can be produced by correcting the reference FOD voltage profile 71 based on the reference maximum flying height FH_TD of the magnetic head 41 that is preset at the room temperature using the equations [1] and [2]. By applying the FOD voltage produced based on the applied FOD voltage profile 72 to the magnetic head 41 in the user environment, the FH of the magnetic head 41 can be appropriately controlled. When the measured temperature is high, since a method that is substantially the same as that used for the low temperature is used, a detailed description will be omitted herein.

Even when the measured temperature in the actual burn-in process is different from the preset room temperature, that is, even when the temperature changes variously during the burn-in process, the effect of the temperature can be compensated. Thus, by using the FOD voltage produced based on the applied FOD voltage profile 72 that is corrected as above in the user environment, not only the FH of the magnetic head 41 can be appropriately controlled but also reliability in the FOD control with respect to the FH of the magnetic head 41 can be improved.

Figure 8:
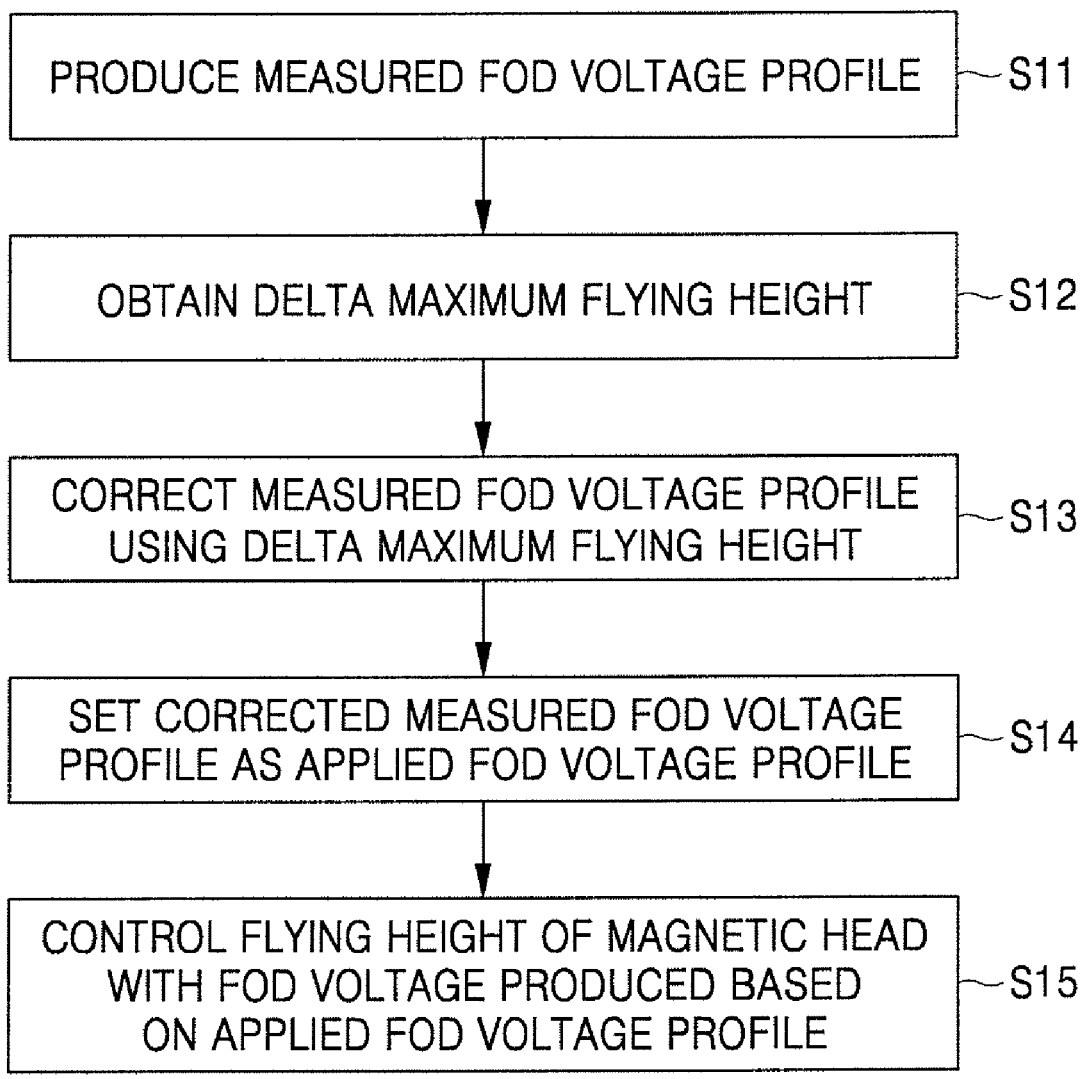
FIG. 8 is a flowchart illustrating a method to control a FH of a magnetic head of a hard disk drive apparatus according to an embodiment of the present general inventive concept.

The method to control the FH of the magnetic head of the hard disk drive apparatus configured as above will be described with reference to FIG. 8. FIG. 8 is a flowchart illustrating a method to control a FH of a magnetic head of a hard disk drive apparatus according to an embodiment of the present general inventive concept.

In the burn-in process of the measured temperature, that is, an actually measured temperature, the reference FOD voltage profile 71 defining the relationship between the FH of the magnetic head 41 that changes according to the FOD voltage and the FOD voltage applied to the magnetic head 41 is produced by applying the FOD voltage to the magnetic head 41 (operation S11). That is, when the FOD voltage is increasingly applied to the magnetic head 41 at the measured temperature, the FH of the magnetic head 41 is gradually lowered and the end portion of the magnetic head 41 touches the disk 11. The reference FOD voltage profile 71 is provided through the above touchdown test.

Then, the delta maximum flying height ΔFH_TD is obtained by subtracting the reference maximum flying height FH_TD of the magnetic head 41 at the room temperature from the maximum flying height FHTs_TD of the magnetic head 41 when the magnetic head 41 touches down in the reference FOD voltage profile 71 (operation S12). The delta maximum flying height ΔFH_TD is a positive (+) value when the measured temperature is lower than the room temperature and a negative (−) value when the measured temperature is higher than the room temperature.

The reference FOD voltage profile 71 is corrected using the delta maximum flying height ΔFH_TD (operation S13). The corrected reference FOD voltage profile 71 which is a profile corresponding to each value of the reference FOD voltage profile 71 before the correction can be produced by a predetermined equation. For example, when an FOD voltage of a predetermined amount is applied to the magnetic head 41, the FH of the magnetic head 41 corrected according to the FOD voltage of a predetermined amount can be obtained from the equation [2]. When each value obtained by the equation is linearly connected, the corrected reference FOD voltage profile 71 is obtained. The corrected reference FOD voltage profile 71 is set as the applied FOD voltage profile 72 applied in the actual user environment (operation S14). Next, the FH of the magnetic head 41 is appropriately controlled by applying the FOD voltage produced based on the applied FOD voltage profile 72 in the user environment (operation S15).

According to the present embodiment, the effect of the temperature in the burn-in process is offset by correcting the reference FOD voltage profile 71 defining the correlation between the FOD voltage and the FH of the magnetic head 41 at the measured temperature using the reference maximum flying height FH_TD at the room temperature. Thus, even when a difference in the temperature is generated when the reference FOD voltage profile 71 is provided, the FH of the magnetic head 41 can be more accurately controlled during the read/write operations so that the weak write or HDI problem can be solved.

According to the above-described embodiments of the present general inventive concept, the weak write or HDI problem that is generated by incorrectly selecting the FOD voltage needed to maintain a target FH of a magnetic head due to an environment of a burn-in process to measure a FH of the magnetic head using an FOD apparatus, in particular, an effect of temperature, can be prevented so that reliability in the FOD control can be improved.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of controlling a flying height of a magnetic head of a hard disk drive apparatus, the method comprising:
producing a reference FOD (flying on demand) voltage profile defining a relationship between the flying height of the magnetic head and an FOD voltage at a measured temperature, wherein an end portion of the magnetic head thermally expands and protrudes when the FOD voltage is applied to a heater included in the magnetic head; and
setting the reference FOD voltage profile that is corrected using a reference maximum flying height of the magnetic head that is preset at room temperature, as an applied FOD voltage profile to control the flying height of the magnetic head.

2. The method of claim 1, wherein the reference maximum flying height of the magnetic head is the maximum flying height of the magnetic head corresponding to a value set at the room temperature.

3. The method of claim 2, wherein, in the setting of the reference FOD voltage profile that is corrected using a reference maximum flying height of the magnetic head that is preset at the room temperature, as an applied FOD voltage profile to control the flying height of the magnetic head, the reference FOD voltage profile is corrected based on a difference between the reference maximum flying height corresponding to a value set at the room temperature and the maximum flying height of the magnetic head in the reference FOD voltage profile, and the corrected FOD voltage profile is set as the applied FOD voltage profile.

4. The method of claim 3, wherein the setting of the reference FOD voltage profile that is corrected using a reference maximum flying height of the magnetic head that is preset at the room temperature, as an applied FOD voltage profile to control the flying height of the magnetic head, comprises:

obtaining a delta maximum flying height that is the difference between the reference maximum flying height and the maximum flying height of the magnetic head in the reference FOD voltage profile; and correcting the FOD voltage profile by correcting a measured flying height of the magnetic head by subtracting a value produced from a predetermined equation from the delta maximum flying height of the magnetic head and a ratio of an FOD voltage of a predetermined amount to a touchdown FOD voltage when the magnetic head touches down in the reference FOD voltage profile from the measured flying height of the magnetic head in the reference FOD voltage profile when the FOD voltage of a predetermined amount is applied, and setting the corrected FOD voltage profile as the applied FOD voltage profile to control the flying height of the magnetic head.

5. The method of claim 4, wherein the value which is produced as the ratio of the FOD voltage of a predetermined amount to the touchdown voltage and the delta maximum flying height by the predetermined equation is a value obtained by multiplying the ratio of the FOD voltage of a predetermined amount to the touchdown FOD voltage by the delta maximum flying height.

6. The method of claim 3, wherein the maximum flying height of the magnetic head in the reference FOD voltage profile is the maximum flying height of the magnetic head measured at the measured temperature.

7. The method of claim 3, wherein the maximum flying height of the magnetic head in the reference FOD voltage profile is produced based on a rate of a change in the maximum flying height of the magnetic head for each temperature obtained by a predetermined experiment formula.

8. A computer-readable recording medium having embodied thereon a computer program to execute a method, the method comprises:

producing a reference FOD (flying on demand) voltage profile defining a relationship between a flying height of a magnetic head and an FOD voltage at a measured temperature, wherein an end portion of the magnetic head thermally expands and protrudes when the FOD voltage is applied to a heater included in the magnetic head; and setting the reference FOD voltage profile that is corrected using a reference maximum flying height of the magnetic head that is preset at room temperature, as an applied FOD voltage profile to control the flying height of the magnetic head.

9. A hard disk drive apparatus, comprising:

a magnetic head to record data on a disk or to reproduce data from the disk; and a controller to produce a reference FOD (flying on demand) voltage profile defining a relationship between a flying height of the magnetic head and an FOD voltage at a measured temperature, wherein an end of the magnetic head thermally expands and protrudes when the FOD voltage is applied to a heater included in the magnetic head, to correct the reference FOD voltage profile using a reference maximum flying height of the magnetic head that is preset at room temperature, and to control the flying height of the magnetic head based on an applied FOD voltage profile that is the corrected reference FOD voltage profile.

10. The hard disk drive apparatus of claim 9, wherein the reference maximum flying height of the magnetic head is the maximum flying height of the magnetic head corresponding to a value set at the room temperature.

11. The hard disk drive apparatus of claim 10, wherein the controller corrects the reference FOD voltage profile based on a difference between the reference maximum flying height corresponding to a value set at the room temperature and the maximum flying height of the magnetic head in the reference FOD voltage profile to correct the FOD voltage profile using the reference maximum flying height of the magnetic head.

12. The hard disk drive apparatus of claim 11, wherein, to correct the FOD voltage profile based on the difference between the reference maximum flying height and the maximum flying height of the magnetic head in the reference FOD voltage profile, the controller obtains a delta maximum flying height that is the difference between the reference maximum flying height and the maximum flying height of the magnetic head in the reference FOD voltage profile and corrects the FOD voltage profile by subtracting a value produced from a predetermined equation from the delta maximum flying height of the magnetic head and a ratio of an FOD voltage of a predetermined amount to a touchdown FOD voltage when the magnetic head touches down in the reference FOD voltage profile from the measured flying height of the magnetic head in the reference FOD voltage profile when the FOD voltage of a predetermined amount is applied.

13. The hard disk drive apparatus of claim 12, wherein the value which is produced as the ratio of the FOD voltage of a predetermined amount to the touchdown voltage and the delta maximum flying height by the predetermined equation is a value obtained by multiplying the ratio of the FOD voltage of a predetermined amount to the touchdown FOD voltage by the delta maximum flying height.

14. The hard disk drive apparatus of claim 10, wherein the maximum flying height of the magnetic head in the reference FOD voltage profile is the maximum flying height of the magnetic head measured at the measured temperature.

15. The hard disk drive apparatus of claim 10, wherein the maximum flying height of the magnetic head in the reference FOD voltage profile is produced based on a rate of a change in the maximum flying height of the magnetic head for each temperature obtained by a predetermined experiment formula.

16. A hard disk drive apparatus usable in a user environment, comprising:

a magnetic head to record data to or reproduce data from a disk; and a controller to control a flying height of the magnetic head with respect to the disk based on a calculated reference maximum flying height set at room temperature.

17. A hard disk drive apparatus usable in a user environment, comprising:
   a magnetic head to record data to or reproduce data from a disk; and
   a controller to produce a reference FOD (flying on demand) voltage profile, to correct the reference FOD voltage profile using a reference maximum flying height of the magnetic head set at room temperature and to control a flying height of the magnetic head based on the corrected reference FOD voltage profile.

18. The hard disk drive apparatus of claim 17, wherein the reference FOD voltage profile defines a relationship between the flying height of the magnetic head and an FOD voltage at a measured temperature.

19. The hard disk drive apparatus of claim 18, wherein the corrected reference FOD voltage profile is an applied FOD voltage profile.

20. A method of controlling a flying height of a magnetic head of a hard disk drive apparatus, the method comprising:
   recording data to or reproducing data from a disk in a user environment; and
   controlling a flying height of the magnetic head with respect to the disk based on a reference maximum flying height set at room temperature.

21. A method of controlling flying height of a magnetic head of a hard disk drive apparatus, the method comprising:
   recording data to or reproducing data from a disk in a user environment;
   producing a reference FOD (flying on demand) voltage profile;
   correcting the reference FOD voltage profile using a reference maximum flying height of the magnetic head set at room temperature; and
   controlling a flying height of the magnetic head based on the corrected reference FOD voltage profile.

* * * * *